United States Patent [19]

Wagatsuma

[11] Patent Number: 4,458,136
[45] Date of Patent: Jul. 3, 1984

[54] METHOD AND APPARATUS FOR MANUFACTURING A LAMP

[75] Inventor: Yuji Wagatsuma, Yokosuka, Japan

[73] Assignee: Tokyo Shibaura Denki Kabushiki Kaisha, Kawasaki, Japan

[21] Appl. No.: 339,049

[22] Filed: Jan. 12, 1982

[30] Foreign Application Priority Data

Jan. 23, 1981 [JP] Japan .................... 56-7879

[51] Int. Cl.³ ............ B23K 9/00; B23K 9/06; H01K 3/02
[52] U.S. Cl. ............... 219/137 R; 219/75; 219/130.4; 445/27
[58] Field of Search ......... 219/137 R, 130.4, 75; 228/219; 445/27

[56] References Cited

U.S. PATENT DOCUMENTS 1,443,439 1/1923 Southgate ................ 219/75

FOREIGN PATENT DOCUMENTS 3617899 9/1961 Japan .

Primary Examiner—C. C. Shaw
Assistant Examiner—Alfred S. Keve
Attorney, Agent, or Firm—Schwartz, Jeffery, Schwaab, Mack, Blumenthal & Koch

[57] ABSTRACT

A method and apparatus for manufacturing a lamp involves preparing a lamp assembly having a base to which is coupled a bulb with external lead-in wires. One of the lead-in wires has an outer end which is drawn out between the bulb and the edge of the base. A potential is applied between a welding electrode of a welding device and the tip of the outer end of the external lead-in wire to weld the lead-in wire to the base. During this applying of potential, a gas flame is interposed between the outer end of the external lead-in wire and the welding electrode.

13 Claims, 2 Drawing Figures

METHOD AND APPARATUS FOR MANUFACTURING A LAMP

BACKGROUND OF THE INVENTION

1. Technical Field of the Invention

The present invention relates to a method and an apparatus for manufacturing a lamp and, more particularly, to an improvement in electrically welding to the base the outer end of an external lead-in wire drawn out of the gap between a bulb and a base of a lamp assembly.

2. Description of the Prior Art

There is a prevalent method conventionally used to connect the outer end of an external lead-in wire coming from a glass bulb which is an airtight vessel of a lamp assembly, e.g., an incandescent lamp assembly. The outer end of the wire is conductively connected to a metallic terminal or a base which, in turn, is coupled or fixed on an end of the glass bulb by means of an arc-welding.

In this conventional process, the lamp assembly is prepared by coupling to a base, a bulb having external lead wires connected to its filament. This is accomplished with a base coupling device. One of the external lead-in wires is drawn out its outer end between the bulb and the edge of the base. The lamp assembly is supported and conveyed by a support. A welding rod, to which negative DC voltage and high frequency voltage may be applied, is arranged to be adjacent to the outer end of the external lead-in wire at the welding stage.

Therefore, an arc discharge takes place between the welding rod and the outer end of the external lead-in wire, and then the outer end of the external lead-in wire is welded to the base.

As compared with a method and apparatus that will effect brazing of the external lead-in wire to the base with a metallic solder, the above-described method and apparatus is advantageous in that it keeps the base coupling device from being stained by a soldering liquid, keeps the base from being discolored by the soldering liquid, and further permits coupling of the aluminum base to the bulb and coupling of the base of brass to the bulb without changing equipment.

However, the prevailing, conventional method and apparatus requires that there be a gap between both electrodes, i.e., the welding rod and the outer end of the external lead-in wire, which gap must be maintained at an extremely short distance for generation of an arc discharge through the air for arc welding. Moreover, the external lead-in wire cannot be welded to the base by a desired arc current unless a high voltage is applied to generate the arc. Furthermore, a fluctuation in power voltage for arc welding and a fluctuation in gap due to a consumption of the welding rod which works as an electrode for the arc welding, inevitably induce a fluctuation in arc current, a disability to generate the arc, or an unsteadiness of arc welding. Therefore, an extremely fine adjustment on an arc generating device must be provided for steady arc welding.

SUMMARY OF THE INVENTION

Therefore, it is an object of the present invention to provide a novel and improved method and apparatus for manufacturing a lamp.

It is another object of the invention to provide a novel method and apparatus for manufacturing a lamp by an improved process for electrically welding a lead-in wire to a base.

It is a further object of the invention to provide a novel method and apparatus for manufacturing a lamp in which a stable arc is generated in spite of a fluctuation in the gap due to a consumption of the welding electrode or a fluctuation of power voltage.

It is still another object of the invention to provide a method and apparatus for manufacturing a lamp utilizing a welding process which effects accurate arc welding.

In accomplishing the foregoing objects, there has been provided according to the invention a method of manufacturing a lamp comprising preparing a lamp assembly which has a bulb having external lead-in wires coupled to a base, one of the lead-in wires having an outer end which is drawn out between the bulb and the edge of the base, applying a potential between a welding electrode of a welding device and the tip of the outer end of the external lead-in wire to weld the lead-in wire to the base and, during said potential applying step, interposing a gas flame between the outer end of the external lead-in wire and the welding electrode.

Other objects, features and attendant advantages of the invention will become readily apparent as the method and the apparatus become better understood by reference to the following detailed description of preferred embodiment, when considered in connection with the accompanying drawing.

BRIEF DESCRIPTION OF THE DRAWINGS

In the drawings, forming a part hereof, in which like reference characters denote like parts in the various views.

DETAILED DESCRIPTION OF PREFERRED EMBODIMENTS

Now there will be described a preferred embodiment of the invention according to FIGS. 1 and 2.

Figure 1:
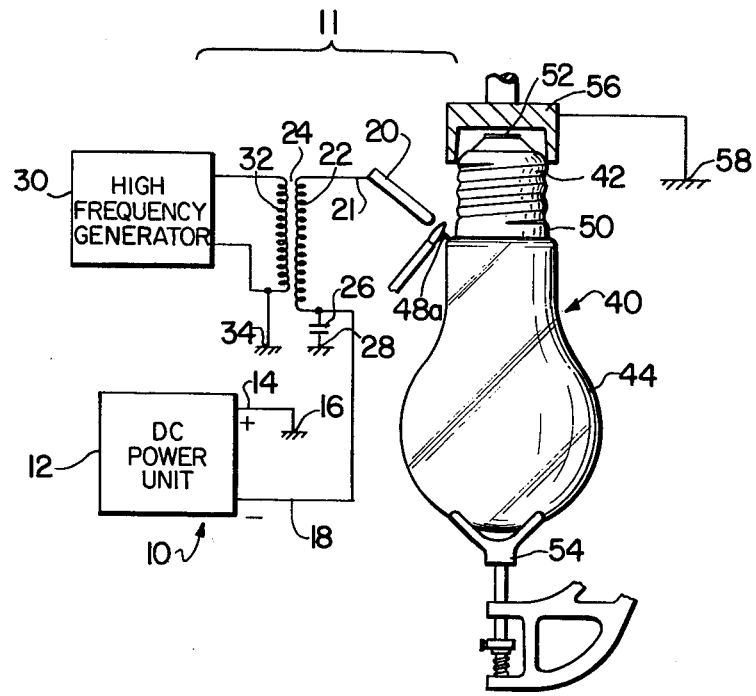
FIG. 1 is a partly broken side view with circuit diagram of an apparatus for manufacturing a lamp according to the preferred embodiment of the invention.
Figure 2:
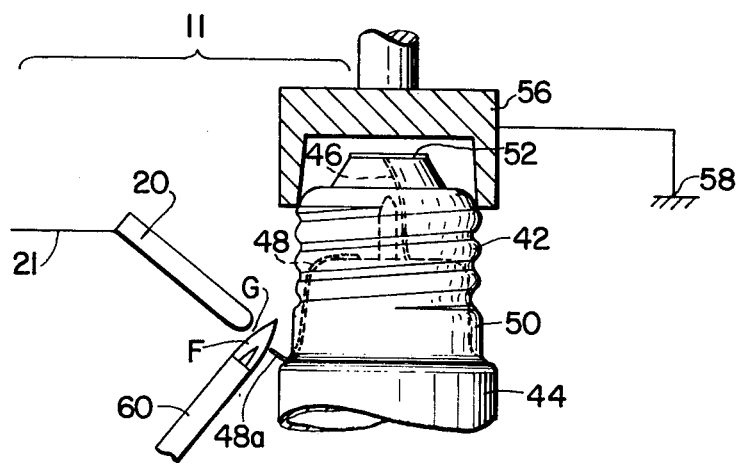
FIG. 2 is an enlarged side view, partly in section, of the apparatus for manufacturing a lamp according to the preferred embodiment of the invention.

In FIG. 1, reference numeral 10 designates a circuit diagram of a welding device 11 for arc-welding. A DC power unit 12 has a positive side terminal 14 grounded at 16 and a negative side terminal 18. The negative side terminal 18 is connected to a welding electrode or rod 20 of the welding device 11 through a lead wire 21 from a secondary winding 22 of a step-up transformer 24. A capacitor 26 is connected to the secondary winding 22 and the negative side terminal 18, and then grounded at 28. On the other hand, the step-up transformer 24 is connected to a high frequency generator 30 through its primary winding 32 grounded at 34 so that a high frequency voltage is impressed on the primary winding 32 and a high voltage at high frequency is induced on the secondary winding 22 of the step-up transformer 24.

Therefore, a DC voltage generated at 200 V by the DC power unit 12 is impressed on the welding rod 20 through the capacitor 26 in addition to the high voltage at high frequency.

A lamp assembly 40 for an incandescent lamp is prepared by means of coupling a metal terminal or base 42 to the end part of an airtight vessel or glass bulb 44. The bulb 44 has a light source structure (not shown), for example a filament, therein, and two external lead-in wires 46, 48, as shown by phantom lines in FIG. 2, which extend out of the end of the light source structure. The base 42 has a base shell 50 and an eyelet terminal 52. The external lead-in wire 46 is connected to the eyelet terminal 52 and the external lead-in wire 48 has an outer end 48a which is drawn out from the gap between the base 42 and the bulb 44, namely, between the edge of the base shell 50 and the bulb 44 in the area where the edge of the base shell 50 mates with or contacts the bulb 44 as shown in phantom line in FIG. 2. The outer end 48a of the external lead-in wire 48 is folded to the side of the base 42.

The lamp assembly 40 is mounted on a holder or support 54 of a turntable (not shown) and the base 42 is covered with a holder or lid 56 of conductive material grounded at 58. Therefore, the lid 56, on the one hand, serves as a holder for the base 42 cooperating with the support 54, and it also serves, on the other hand, as a connecting member for grounding the base 42. That is, it also serves as part of the welding device 11. A positive side potential is applied to the external lead-in wire 48 through the base shell 50. A gas burner 60 is provided so as to provide a flame F from combustion of coal gas in a gap G between the tip of the welding rod 20 and the outer end 48a of the external lead-in wire 48, the latter working as one electrode connected through the base shell 50 at the time of arc welding.

The manufacturing process according to the present invention is further described as follows.

The DC voltage with high frequency voltage is impressed on a welding rod 20 working as another electrode at the time of arc welding and connected through the lead wire 21.

Even though the gap G between the welding rod 20 and the outer end 48a of the external lead-in wire 48 may become relatively large during arc welding, an arc discharge is thus obtainable for welding by interposing the gas burner flame F in the gap G.

EXAMPLE

Using a copper wire 0.35 mm in outside diameter for external lead-in wires 46, 48 of the incandescent lamp, the inventor carried out a test by interposing the flame F of the coal gas burner 60 between the welding rod 20 and the outer end 48a of the lead-in wire 48 in contact with the base shell 50 of brass 0.3 mm thick. The inventor found that a DC power voltage of 230 to 250 V was required when the gas burner flame F was not provided, and an arc discharge was not generated unless the gap 62 between the tip of external lead-in wire 48 and the welding rod 20 was 2 mm or below. However, according to the method of the invention, a DC power voltage of 200 V was powerful enough to give an arc discharge, even when the gap G between the tip of external lead-in wire 48 and the welding rod 20 was at 6 mm. In this regard, the arc welding was obtained easily on a voltage fluctuating extensively from 200 to 250 V, and moreover, the consumption of the welding rod 20 working as the negative electrode was decreased one-third or below that experienced in the conventional method.

A possible explanation of the results achieved by the present invention is that carbon in the gas burner flame is ionized and ready for transfer according to the DC voltage applied between both the electrodes. This may accelerate a transfer of electrons to generate arc with a relatively small amount of energy. It is also possible that temperatures of both the electrodes rise due to heating by the gas burner, and that the transfer of ions and electrons is made easier thereby. Only a small energy is available in the capacitor of the circuit connected to the DC power unit, and thus the arc welding is almost free from being influenced by voltage fluctuation. An unsteadiness of arcing at the time of arc welding is thus eliminated, an accurate arc welding is obtainable even with fluctuation in the welding gap, and an unsteadiness of welding due to fluctuation in power voltage is also eliminated.

Although a specific manufacturing process and manufacturing apparatus for an incandescent lamp has been described herein, the invention need not necessarily be used only for manufacturing incandescent lamps. It applies to any lamps, including fluorescent lamps and discharge lamps. Also, the base need not be limited to E-type base used for an incandescent lamp, as G-type base used for the fluorescent lamp can be used as well.

What is claimed is:

1. A method for manufacturing a lamp, comprising the steps of:

preparing a lamp assembly so as to have a bulb coupled to a base and having external lead-in wires, the base having an edge which mates with said bulb, one of the lead-in wires having an outer end which is drawn out between the bulb and the edge of the base;

applying a potential between a welding electrode of a welding device and a tip of said outer end of the external lead-in wire; and during said potential applying step, interposing a gas flame between the outer end of the external lead-in wire and said welding electrode.

2. A method for manufacturing a lamp according to claim 1, wherein a gap between said welding electrode and said outer end of said external lead-in wire is less than 6 mm and said applied potential is 200 to 250 V with high frequency.

3. A method for manufacturing a lamp according to claim 1, wherein said gas flame is provided by burning coal gas.

4. An apparatus for manufacturing a lamp comprising:

a support for supporting a lamp assembly, the lamp assembly having a bulb coupled to a base and external lead-in wires, the base having an edge which mates with said bulb, one of the lead-in wires having an outer end which is drawn out between said bulb and the edge of said base;

a welding device cooperating with said support, said welding device having a welding electrode so disposed with respect to said support as to be adjacent to the outer end of said external lead-in wire, said welding device being for applying a potential between said welding electrode and the outer end of the lead-in wire;

a gas burner so disposed with respect to said support and said welding device as to interpose a flame between the outer end of the external lead-in wire and said welding electrode.

5. An apparatus for manufacturing a lamp according to claim 4, wherein said welding device further comprises means for grounding said base.

6. An apparatus for manufacturing a lamp according to claim 4, wherein said support comprises a first holder for said bulb and a second holder for said base.

7. An apparatus for manufacturing a lamp according to claim 4, wherein said support comprises a first holder for said bulb and a second holder for said base, said second holder being made of conductive material to be electrically connected to said base, and wherein said welding device comprises means for grounding said base, said grounding means including said second holder.

8. A method for manufacturing a lamp according to claim 1, wherein a gap is formed between the outer end of the external lead-in wire and the welding electrode, which welding electrode extends toward the external lead-in wire, and wherein said step of interposing a gas flame is carried out by directing the gas flame from a burner which is separate from the electrode into the gap between the electrode and lead-in wire.

9. A method for manufacturing a lamp according to claim 8, wherein the flame is directed into the gap between the electrode and lead-in wire in a direction generally transverse to the direction in which the electrode extends.

10. An apparatus for manufacturing a lamp according to claim 4, wherein said gas burner is separate from said electrode.

11. An apparatus for manufacturing a lamp according to claim 10, wherein said welding electrode extends toward the lead-in wire and wherein said gas burner extends in a direction generally transversely to said direction in which said electrode extends, whereby said flame is interposed into a gap between the electrode and the lead-in wire in a direction which is generally tranverse to the direction in which said electrode extends.

12. A method for manufacturing a lamp, comprising the steps of:
preparing a lamp assembly so as to have a bulb coupled to a base and having external lead-in wires, the base having an edge which mates with said bulb, one of the lead-in wires having an outer end which is drawn out between the bulb and the edge of the base;
applying a potential between a welding electrode of a welding device and a tip of said outer end of the external lead-in wire, the welding electrode and the tip of the outer end of the external lead-in wire defining a gap therebetween; and
during said potential applying step, increasing the electrical conductivity in the gap to reduce the criticality of the size of the gap and to reduce the criticality of the characteristics of the electrical energy supplied to the welding electrode, said electrical conductivity increasing step being carried out by interposing a gas flame into said gap.

13. An apparatus for manufacturing a lamp comprising:
a support for supporting a lamp assembly, the lamp assembly having a bulb coupled to a base and external lead-in wires, the base having an edge which mated with said bulb, one of the lead-in wires having an outer end which is drawn out between said bulb and the edge of said base;
a welding device cooperating with said support, said welding device having a welding electrode so disposed with respect to said support as to be adjacent to the outer end of said external lead-in wire, said welding device being for applying a potential between said welding electrode and the outer end of the lead-in wire, said welding electrode and the outer end of said lead-in wire forming a gap therebetween; and
means for increasing the electrical conductivity in said gap to thereby reduce the criticality of the size of the gap and to reduce the criticality of the characteristics of the electrical energy supplied to the welding electrode, said electrical conductivity increasing means including a gas burner so disposed with respect to said support and said welding device as to interpose a flame into the gap.

* * * * *